Nov. 16, 1926. 1,607,569
T. L. SHOCKLEY ET AL
PLANT SETTING DEVICE
Filed April 29, 1926
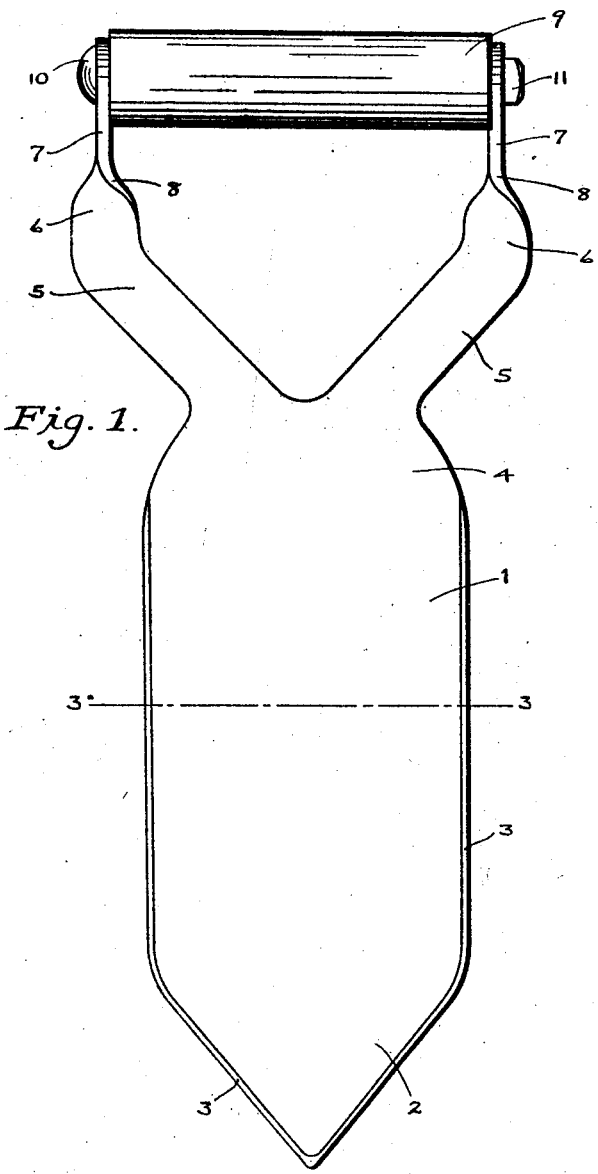
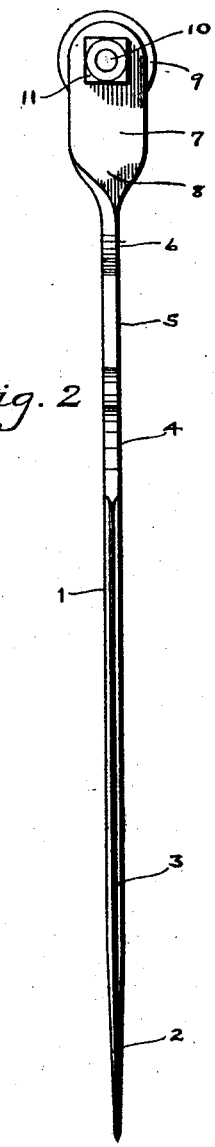
INVENTORS
Thomas L. Shockley
Joseph D. James
BY
ATTORNEY.

Patented Nov. 16, 1926.

1,607,569

UNITED STATES PATENT OFFICE.

THOMAS L. SHOCKLEY, OF BILLINGS, AND JOSEPH D. JAMES, OF SPRINGFIELD, MISSOURI.

PLANT-SETTING DEVICE.

Application filed April 29, 1926. Serial No. 105,561.

This invention relates to garden tools and pertains particularly to a ground penetrating tool adapted to be used in connection with the setting of plants such as strawberry, tomato and other small plants.

The primary object of this invention is the provision, in a manner as hereinafter set forth, of a knife-like tool adapted to penetrate the soil and having a relatively long and broad blade portion by means of which a hole of any desired size can be formed in the ground to receive one of the plants being set.

A final object of the invention is the provision, in a manner as hereinafter set forth, of a tool of the character described which is of simple construction, comparatively inexpensive to manufacture and easy to handle and use.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1 shows the tool embodying this invention in side elevation.

Figure 2 shows the tool in edge elevation and

Figure 3 is a transverse section taken upon the line 3—3 of Figure 1.

Referring now to the drawing in detail wherein like numerals of reference indicate corresponding parts throughout the several views the tool is shown as consisting mainly of a blade body indicated as a whole by the numeral 1. This blade body is, as clearly shown, relatively short and very broad and is also relatively thin as is clearly shown in Figures 2 and 3. One end of the blade body 1 is cut to form the tapered point or penetrating end 2 and the edges of the body throughout the length of the sides and of the point portion 2, are sharpened to form the cutting edge 3.

At the other end of the body 1 there is formed a constricted or neck portion 4 and from this neck portion the upwardly extending divergent arms 5 project in the form of the letter V. The upper ends of the arms 5 are each bent to form the vertical portion 6 which merge into the vertical terminal portions 7 which portions are formed to bring their broad faces in opposed relation, by torsionally twisting the vertical portions 6 of the arms at the points 8.

Located between the opposed portions 7 is a hand grip 9 formed preferably of a cylindrical body of wood and extending longitudinally through this hand grip 9 and through the ends of the portions 7 which overlie the ends of the hand grip, is a bolt 10 secured in position by the nut 11 which projects beyond one of the upstanding portions 7 as shown.

In the use of this implement, the pointed end 2 is forced into the earth to the desired depth, and may be forced over to one side or the other to form a hole of any desired width. When the tool is extracted there remains a place for the setting of the plant.

Having thus described our invention what we claim is:—

1. A tool of the character and for the purpose set forth, comprising a relatively broad, flat blade body, pointed at one end, a pair of integral arms extending from the other end of said blade in divergent relation, the free ends of said arms being bent toward one another to set up spaced parallel portions, said free ends further being torsionally twisted at the point of joinder with the divergent portions to bring the broadest surfaces of the parallel portions in opposed relation, and a handle member arranged between said opposed surfaces and secured at the ends thereto.

2. In a tool of the character and for the purpose set forth, a relatively broad flat blade body pointed at one end and having the side edges and pointed end formed throughout to set up a cutting edge, a pair of arms extending in divergent relation from the other end of the blade in a plane with the width thereof, the free ends of said divergent arms being bent to set up spaced parallel portions, substantially parallel with the longitudinal center of said blade, a hand grip arranged between and contacting at the ends with said parallel portion, and means for securing the hand grip to said parallel portion.

In testimony whereof, we affix our signatures hereto.

THOMAS L. SHOCKLEY.
JOSEPH D. JAMES.